Patented July 6, 1926.

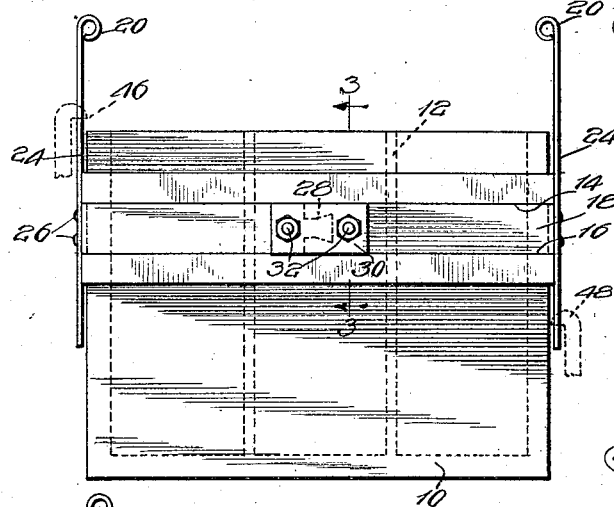

1,591,811

UNITED STATES PATENT OFFICE.

WILLIAM H. DUGGAN, OF CHICAGO, ILLINOIS, ASSIGNOR OF ONE-HALF TO BENJAMIN CLARKE, OF CHICAGO, ILLINOIS.

BATTERY CELL AND HANDLE.

Application filed July 9, 1924. Serial No. 724,952.

My invention relates to storage batteries and more specifically to an improved cell and handle for lifting the same and means for holding cell in place on the car, and for eliminating the necessity of fastening handles in or to the box or cell.

For some time storage batteries for motor vehicles and similar service were wooden boxes, in which individual containers for each cell of the battery were placed. More recently, all this structure has been embodied in one single integral structure of composition. These batteries have to be lifted out of the car for detailed inspection, repair, or recharging. In the integral construction, these handles are in the form of perforated lugs projecting upwardly from the upper edges of the end walls of the structure, or the handles are inserted in the ends of the composition wall, or fastened to the end of the case. It is difficult to fasten or attach the handles to the case on account of the low structural strength of the acid resisting composition material of the case, and their exposed position renders them liable to frequent breakage by tearing out of the wall where the handles are inserted, or screws are used to fasten it. It is practically impossible to replace such handles once they are broken, which renders the entire case useless, on account of the difficulty of removing the battery or holding it in place on the car.

It has been customary to fasten hold downs to the tops of the handles or the top of the case. When the handle is attached to or inserted into the material of the cell this strains the end of the case. This has a tendency to bulge the end, pulling the end of case outwardly, which loosens the sealing compound on top of the individual cells, permitting acid to seep through. This tendency is especially noticeable when the cell is hot and the material is more or less flexible. This may be due to hot weather, internal resistance or short-circuits, or a long charge at a high rate.

Among the chief objects of the invention may be enumerated the elimination of any perforations in the material of the case; effective distribution of the loads due to carrying or the hold-down means; ample strength in the handles, and ready replacement of broken handles without disturbing the case or its contents.

Figure 1 is a side elevation of one type of battery cell and handle therefor, according to the invention;

Fig. 2 is a vertical section of the end wall and handle;

Fig. 3 is a section on line 3—3 of Fig. 1;

Fig. 4 is a detail of an alternative strap joint;

Fig. 5 is a side elevation similar to Fig. 1 of the other construction;

Fig. 6 is a detail showing the handle offset against the case.

In the embodiment of the invention selected for the illustration the body 10 is formed, as usual, of composition material to define a substantially rectangular receptacle. This may or may not be divided by interior partitions 12 into compartments within which the individual cells of the battery are installed. At an appropriate distance below the upper edge of the wall, I provide a downwardly facing shoulder 14 and upward facing shoulder 16 spaced to receive a strap 18. In the embodiment shown, these shoulders extend entirely around the body, but it will be obvious that portions of the same may be omitted, leaving isolated lugs at points where they are needed to carry the load. Strap 18 encircles the body 10, just below shoulder 14, and in abutment with both shoulders. At each end of the container, I provide a handle comprising a bale 20 joined to the main handle portion by risers 22. In the embodiment illustrated in Figs. 1 and 2, the shank 24 of the handle is united to the strap 18 by welding or rivets 26. The ends of strap 18 have a dove-tailed interlock at 28 covered by plate 30 to which the ends of the strap are also bolted or riveted at 32.

Alternatively as in Figs. 4 and 5, end 34 is bent back at 36 and the free edge of the bent back portion is cut away at an angle at 38. Similarly end 40 is bent back at 42 and beveled at 44. The initial length of the strap is preferably such that it can be readily bent by the workman to approximate shape. With the ends substantially in the relative position indicated in Fig. 4, it will be apparent that when end 40 is moved up to interlock its hook with end 34, the inclined edge 44 will strike the bight of the hook in the other end, and inclined edge 38 will have a similar wedging action on the bight of the other hook. By reason of this action, forcing the two hooks into interlocking engagement, he can shorten the strap and develop a strong tension to make it fit the body snugly. For convenience in assembly, the lower shoulder is beveled down at 45 and ends at 47.

After the hooks have been assembled, it is necessary to fasten them against unfolding. One convenient way of doing this is to insert a screw or rivet at the joint through the four thicknesses of the metal, to hold the hooks securely in place. Another advantageous fastening for the joint is by means of welding.

In the construction shown, there is no projecting and relatively weak portion of the body apt to be accidentally broken, and performing an important function during use of the device, so that breakage is serious. The metal handles and strap carry the strain, and not the case proper, and if the strap is made of metal having a fair resistance to corrosion it may well outlast the other portions of the battery. If desired, it may be painted or otherwise coated with acid-resisting material. In any event, breakage of the handle is easily remedied by installing a new strap, whereas, with the composition lugs for handles, or where handles are fastened to the ends of the case, breakage practically means a new body or continued difficulty in handling the broken one.

When in place in the vehicle, these units have to be securely fastened down against accidental outward displacement, due to the jolting and jarring of the vehicle. For this purpose, it is customary to employ hold downs, which are usually placed over the tops of the handles or hooked over some outwardly facing horizontal surface on the body 10. In the accompanying drawing it is apparent that hold down hooks can be fastened to the handles at 46, or the handle may extend below the strap and receive the hold down at 48.

In Fig. 6, I have illustrated the handle offset at 50 to bear against the outer wall of the case.

Without further elaboration, the foregoing will so fully explain the gist of my invention that others may, by applying current knowledge, readily adapt the same for use under various conditions of service, without eliminating certain features, which may properly be said to constitute the essential items of novelty involved, which items are intended to be defined and secured to me by the following claims.

I claim:—

1. A strap and handle fitting for battery cells, comprising in combination, metal strap means encircling the outer walls of the cell, and handle means extending upwardly therefrom, the ends of said strap being turned back on themselves in opposite senses to form interlocking hooks, the free edges of said turned back portions being inclined at opposite corners to engage each the bight of the other hook and form a wedge for drawing the strap tight, and means for fastening said interlocked hooks against unfolding.

2. A strap and handle fitting for battery cells comprising, in combination, metal strap means encircling the outer walls of the cell, and handle means extending upwardly therefrom, the ends of said strap being turned back on themselves in opposite senses to form interlocking hooks, the free edges of said turned back portions being inclined at opposite corners to engage each the bight of the other hook and form a wedge for drawing the strap tight, and means for fastening said interlock hooks against unfolding, said fastening means comprising a tension member passing through all four thicknesses of metal.

3. A strap and handle fitting for battery cells, comprising strap means encircling the outer walls of the cell, and handle means extending upwardly therefrom, the ends of said strap being turned back on themselves in opposite senses to form interlocking hooks.

4. In combination with a battery cell, a metal strap encircling the outer walls thereof, a dovetailed joint between the abutting ends of said strap, a cover plate overlying said joint, and fastening means holding said cover plate in place.

5. In combination with a battery cell, a metal strap encircling the outer walls thereof, the abutting ends of said strap being joined by a dove-tailed joint.

6. In combination, a battery cell comprising an insulating container having upwardly and downwardly facing abutment means, a one-piece metal band completely girdling the container, said band cooperating with said upwardly and downwardly facing abutment means and held against upward and downward displacement on the container thereby, and handle means extending upwardly from said band.

7. In combination, a battery cell comprising an insulating container having side and end walls and upwardly and downwardly facing abutment means, a one-piece metal band completely girdling the container, said band including side portions extending along the side walls of the container and integral end portions extending along the end walls of the container, and handle means extending upwardly from each of the end portions of said band.

8. In combination, a battery cell comprising an insulating container having side and end walls and upwardly and downwardly facing abutment means, a one-piece metal band completely girdling the container, said band including side portions extending along the side walls and integral end portions extending along the end walls, handle means extending upwardly from each of the end portions of said band, and hold down means cooperating with said upwardly extending handle means.

In witness whereof, I hereunto subscribe my name this 3rd day of July, 1924.

WILLIAM H. DUGGAN.